United States Patent [19]
Peterson

[11] 3,856,670
[45] Dec. 24, 1974

[54] REMOVAL OF BORON FROM WATER

[75] Inventor: Willard D. Peterson, Pasadena, Calif.

[73] Assignee: Occidental Petroleum Corporation, Los Angeles, Calif.

[22] Filed: Jan. 31, 1972

[21] Appl. No.: 222,385

Related U.S. Application Data

[63] Continuation of Ser. No. 74,877, Sept. 23, 1970, abandoned.

[52] U.S. Cl. .................................. 210/32, 210/38
[51] Int. Cl. ............................................ B01d 15/04
[58] Field of Search ............ 210/24, 30, 32, 37, 38; 423/276, 277, 278, 279

[56] References Cited
UNITED STATES PATENTS

| | | | |
|---|---|---|---|
| 2,813,838 | 11/1957 | Lyman et al. | 210/24 X |
| 3,567,369 | 3/1971 | Chemtob | 210/32 X |

*Primary Examiner*—Samih N. Zaharna
*Assistant Examiner*—I. Cintins

[57] ABSTRACT

This invention discloses a process for the removal of boron values from aqueous media by contacting the aqueous media with a water insoluble solid anionic ion exchange phenolic resin; containing aromatic ortho hydroxy carboxylic groupings, said resin being cross linked with aldehydes; said removal being effectuated in the presence of a cationic species.

14 Claims, No Drawings

REMOVAL OF BORON FROM WATER

This is a continuation of my application Ser. No. 74,877, filed Sept. 23, 1970, now abandoned.

BACKGROUND OF THE INVENTION

Over the last few years there has been a rapid growth in the use of boron-containing chemicals in households. Due to aggressive marketing tactics, there is every indication that the volume of such detergents consumed in the United States will continue to increase, resulting in a new and significant pollution problem. Municipal sewage treatment facilities currently do not remove boron and concentrations of boron in some effluents have already become appreciable.

Control of boron contamination is important due to its toxicity to both plant and animal life. The U.S. Public Health Service recommends a boron concentration of 1.0 PPM for potable water (5.0 PPM maximum) and 0.7 PPM is recommended for most agricultural uses. Many water sources in the world exceed these limits. In the nuclear field even trace amounts of boron must be removed from aqueous coolants to avoid reactor poisoning.

Conventional methods for the removal of boron from water are unsatisfactory for handling the growing municipal boron pollution problem, or the existing agricultural and industrial problem. Reverse osmosis systems do not exclude borate ions and the ion exchange resins which have been proposed for such use are too expensive, or not applicable at such low concentrations, or not specific enough in the presence of interferring ionic species and/or organic contaminants. The art is searching for a method which will selectively permit removal of boron from aqueous solutions containing small but highly undesirable amounts of boron.

SUMMARY OF THE INVENTION

This invention discloses a novel process for the removal of boron values from aqueous solutions having borate ions contained therein comprising contacting the aqueous solution containing borate ions with a water insoluble solid organic ion exchange resin, which resin is produced by the co-condensation of an aromatic ortho hydroxy carboxylic acid, a phenolic compound and an aldehyde to selectively absorb the boron value onto the resin in the presence of at least one cationic species selected from the group consisting of alkali, alkaline earth, nitrogen organic bases and ammonium cations. By the terms in the presence of at least one species selected from the group consisting of alkali, alkaline earth, nitrogen organic bases and ammonium cations is meant that such cations must be present either in the resin itself or in the system such as in the water containing the boron values. The cationic species can be incorporated into the resin during resin formation, or they can be incorporated into the resin by contacting the resin with a solution containing the desired species prior to utilizing the resin in my novel process.

DETAILED DESCRIPTION OF THE INVENTION

The term Boron values, as employed in this application, is meant hydrated Boron oxides which, when incorporated in aqueous systems, ionize to form borate ions. In aqueous systems the borate ions will be present over a broad spectrum of forms such as ortho borates, metaborates, tetraborates, etc. and ionized boric acid over a broad pH spectrum. The ratio of these species is determined by the pH of the solution. However, it is to be understood that my novel process can be employed to remove boron values when they are present in neutral, acidic and alkaline aqueous solutions.

As indicated above, the nature of the boron ion species depends upon the pH of the aqueous system in which they exist. Likewise, this determines in a large measure the nature of the boron complexes generated and absorbed by the resin. Furthermore, the cation species associated with the anionic boron complexes may vary according to the nature of the aqueous system. For example, waters containing calcium, sodium, magnesium, ammoniac organic amines and/or other cations affords boron complex formation with the resin containing one or other of these cationic species. Or, in another mode of operation the ion exchange resin may be converted to a suitable salt prior to contact to provide beneficial boron complexing salts in aqueous systems. The aqueous system may be pretreated to introduce a desirable cation before contacting the solution with the ion exchange resins. For examaple, an irrigation water may be treated by percolation through a dolomite bed to promote pH adjustment with simultaneous introduction of calcium values prior to its contact with the ion exchange resin. These examples are meant to indicate that numerous other ramifications are possible to adjust the pH and to control the ratio of the boron species to achieve enhanced boron removal. In general, boron value removal is enhanced when most of the boron values exist in the form of the borate species.

Conventional ion exchange resin techniques can be utilized to effectuate the contacting of the resin and borate ion to cause the ions to be absorbed upon the resin.

The resins found useable in this invention are formed by the co-condensation of aromatic ortho hydroxy carboxylic acids, phenols and aldehydes. The aromatic ortho hydroxy carboxylic acids found useable in this invention can be any organic compound having a hydroxy and a carboxylic grouping on adjacent carbon atoms, said carbon atoms being members of a benzene ring system. Any benzene ring system containing the ortho hydroxy carboxylic group can be employed which will readily undergo co-condensation with phenols and aldehydes. Exemplary of aromatic orthy hydroxy carboxylic compounds found useable in the practice of my invention are: resorcylic acid; salicylic acid; methyl salicylic acid, 2, hydroxy 3-napthoic acid, methylene bis-salicyclic acid.

Salts of the aromatic ortho hydroxy carboxyclic acid can be utilized in the production of the resin found useable in my invention. Indeed the salts of the resin can be advantageously used in effectuating the absorption of the borate ions and utilized in a preferred embodiment of my invention.

a salt of the resin can be employed to extract the boron values from the aqueous media. The salt of the resin can utilize alkali and alkaline earth, nitrogen organic bases i.e., organic amines, ammonia etc. as the cation in the resin-salt. These resin-salts having enhanced ion exchange capacity can be produced in initial formation of the resin by utilizing salts of the aromatic ortho hydroxy carboxylic acids in the production of the resin, by effectuating the co-condensation required to form the resin in a media containing cationic species which will form the desired resin-salt compound, or by having the desired cationic species present in the aqueous system from which the boron values are to be extracted so as to form the desired resin-salt compound in-situ while removing the boron values from the water. After these resin-salt compounds have been used to remove boron values from water, the boron values can be eluted from the resin-salt compound by contacting the resin with an elution solution selected from the group consisting of aqueous acidic solutions i.e., mineral acid such as sulfuric acid, and aqueous alkaline solutions i.e., alkali metal hydroxides such as sodium hydroxide; and other strong bases such as aqueous ammonium hydroxide. The resin-salt compounds of my invention should contain at least a stoichiometric amount of cationic species equivalent to the amount of boron values which the resin is designed to remove. If less of the cationic species is utilized my process will work at reduced efficiency.

The phenolic compounds found useable in my invention can be any phenolic compound including substituted phenolic compounds provided that the phenolic compound selected will undergo co-condensation with the aromatic ortho-hydroxy carboxylic acid and aldehyde and act as a crosslinking member for the resin. In order for this latter requirement the phenolic compound must have two active positions available for condensation. Exemplary of phenolic compounds found useable in my invention are, phenol, isomeric creosols, etc. The aldehydes found useable in my invention can be any aldehyde which will readily co-condense with the phenolic and aromatic ortho hydroxy carboxylic compounds utilized in the formation of the resins found useable in my invention. Exemplary of aldehydes found useable in my invention are, formaldehyde, formalin, paraldehyde, formals.

The resins found useable in my invention can be prepared by conventional co-condensation techniques. One simple conventional method is to mix the resin ingredients and thereafter promoting the co-condensation of the reactants by adjusting the pH of the mixture. The reaction is especially catalysed at a pH of below about 4.0 or above pH about 6.0. Elevation of the pH of the mixture can be attained by the addition of alkaline materials, e.g., sodium hydroxide. Depression of the pH of the mixture can be attained by the addition of acidic materials, e.g. mineral and/or strong organic acids e.g., oxalic acid, toluene sulfonic acid, etc. In practice, a stepwise condensation can be effectuated by adjusting the pH stepwise during the condensation. Both the physical and chemical nature of the product can be controlled by adjusting the pH during the course of the condensation. Operating temperature is also an important factor in determining the chemical and physical nature of the final resin.

In general, the resins found useable in my invention should be produced by the co-condensation of from about 1 to about 3 molar equivalents of an aromatic ortho hydroxy carboxylic acid, from about 1 to about 3 molar equivalents of a phenolic compound and from about 1 to about 3 molar equivalents of an aldehyde. In a preferred embodiment of my invention the resin is produced by the co-condensation of 3 molar equivalents of salicylic acid, 1 molar equivalent of phenol and three molar equivalents of formaldehyde.

Various well known conventional methods and ramifications thereof can be employed to produce resins having desirable properties, i.e., varying the molar ratios of the reacting species; water content at various stages of the reaction, pH adjustment during the condensation, varying reaction time and temperature during the condensation, the varying the degree and rate of curing, etc. These factors will have a bearing on the physical and chemical properties of the resin. However, it is to be understood that this invention is related to the use of a resin which is useable to remove boron values from aqueous media, and the resins used therein are made using technology which is well known to those skilled in the art. The resins can be produced in any desired shape, size and texture. They are usually produced initially as a solid cake. They can be subdivided and sized by physical means.

The density and porosity of the resins can be adjusted during their production by well known techniques i.e., the use of water soluble salts which are subsequently leached from the water insoluble resin to produce less dense and porous type resins.

The contacting of the resins with the boron values in the practice of my invention can be carried out using conventional techniques i.e., fixed beds, fluid beds, columns, etc.

The high absorbing capacity for boron values is believed to result from the free accessibility of the salicyclic acid groups within the matrix of the resin. Furthermore, the various modes of preparing the resin offer a very high weight percent of the salicylic group in the finished resin. This is not possible in the usual anionic type resins based upon the formation of organic quaternary nitrogen compounds derived from matrices such as the chloromethylene derivatives of divinyl benzene styrene copolymers.

It is believed that these anionic water-insoluble resins have a random distribution of phenol and salicylic acid moeities and that the tri-functional phenol serves to provide the crosslinking necessary to provide the necessary water insolubility characteristics. As little as 10 mole percent of phenol per mole of salicylic acid suffices to provide these water-insolubility properties. The spacial configuration of the hydroxyl and carboxyl groups evidently are not appreciably disturbed during the formaldehyde condensation and hence remain in excellent position for optimized complexing reaction with the borate species.

It is not known how this complex forms, but it appears that borate ion appears to be required for its formation. The borate absorbing capacity of the resin, accordingly, increases with increasing pH within the range 5 and 9 which is known to enhance borate ion formation in dilute borate solutions. The resins have particularly high boron-absorbing capacities when they are finely divided (less than 20 sieve mesh size) and the aqueous system is maintained in the range of pH 7–9.

EXAMPLE 1

A mixture of 35 grams of phenol, 82 grams of salicylic acid, 85 grams of aqueous 37 weight percent formaldehyde and 36 grams of 50 weight percent sodium hydroxide was heated to 85°C. After one hour at this temperature the reaction mixture was slightly viscous and homogeneous. Slow uniform addition of 15 grams of 50 weight percent sodium hydroxide was made over a one-hour period while maintaining the reaction temperature between 85°–90°C. A stiff gel which formed during this time was removed, divided into less than ¼ inch chunks which were heated under reflux with ortho-dichlorobenzene for 90 minutes. Water was added and then the organic solvent was totally removed by steam distillation. The remaining water was decanted from the cured resin, the resin after being air dried, was ground to pass a 20-mesh sieve. The resulting granular resin was extracted three times with 500 ml portions of 90°–95°C water, filtered, and air dried for 24 hours at 27°C.

The boron absorbing capacity of this resin was determined by the following procedure. A six-gram sample of the resin was treated with 100 ml of 0.1 molar boric acid solution and the mixture agitated for 15 hours at room temperature. After this period the aqueous solution had a pH 8.43. Boron content of the solution was determined and showed a loss (under these equilibrium conditions) indicating that the resin absorbed 6.9 milligrams of boron per gram of resin.

EXAMPLE 2

The effectiveness of the above resin for removing boron values from a sample of irrigation water was determined by the following procedure.

A five gram sample of the resin produced in example 1, was treated with 50 ml of an irrigation waste water which had been analyzed and found to contain 10.6 PPM of boron. After agitating this mixture for four hours, the supernatant liquor (representing an equilibrium exchange) was again analyzed for boron content. The analysis indicated that less than 1 PPM boron remained in this treated waste water.

What is claimed is:

1. A process for the removal of boron values from aqueous solutions having borate ions contained therein comprising contacting the aqueous solution containing borate ions with a water insoluble solid organic ion exchange resin, which resin is produced by the co-condensation of an aromatic ortho-hydroxy carboxylic acid, a phenolic compound and an aldehyde to selectively absorb the boron value onto the resin in the presence of at least one cationic species selected from the group consisting of alkali, alkaline earth, nitrogen organic bases and ammonium cations.

2. The process of claim 1 wherein said resin is produced by the co-condensation of from about 1 to about 3 molar equivalents of an aromatic ortho hydroxy carboxylic acid; from about 1 to about 3 molar equivalents of a phenolic compound, from about 1 to about 3 molar equivalents of an aldehyde.

3. The process of claim 1 wherein said resin is produced by the co-condensation of three molar equivalents of an aromatic ortho-hydroxy carboxylic acid, 1.0 molar equivalents of a phenolic compound and three molar equivalents of an aldehyde.

4. The process of claim 3 wherein said aromatic hydroxy carboxylic acid is salicylic acid.

5. The process of claim 3 wherein said phenolic compound is phenol.

6. The process of claim 3 wherein said aldehyde is an aldehyde selected from the group consisting of formaldehyde and paraldehyde.

7. The process of claim 6 wherein said aldehyde is formaldehyde.

8. The process of claim 1 wherein said resin is a condensate containing about three molar equivalents of salicylic acid, 1.0 molar equivalent of phenol and three molar equivalents of formaldehyde.

9. The process of claim 1 wherein said resins having said borate selectively absorbed thereon are eluted from the resin by contacting the resin with an elution solution selected from one of the group consisting of acidic aqueous solutions and alkaline aqeuous solutions.

10. The process of claim 9 wherein said elution solution is an aqueous mineral acid.

11. The process of claim 10 wherein said mineral acid is sulfuric acid.

12. The process of claim 9 wherein said elution solution is an aqeuous solution of an alkali metal hydroxide.

13. The process of claim 12 wherein said alkali metal hydroxide is sodium hydroxide 14. The process of claim 9 wherein said elution solution is an aqueous solution of ammonium hydroxide.

* * * * *